United States Patent
Mermoud et al.

(10) Patent No.: US 12,255,822 B2
(45) Date of Patent: Mar. 18, 2025

(54) LOAD BALANCING APPLICATION TRAFFIC WITH PREDICTIVE GOODPUT ADAPTATION

(71) Applicant: Cisco Technology, Inc., San Jose, CA (US)

(72) Inventors: Grégory Mermoud, Venthône (CH); Jean-Philippe Vasseur, Saint Martin d'Uriage (FR)

(73) Assignee: Cisco Technologies, Inc., San Jose, CA (US)

( * ) Notice: Subject to any disclaimer, the term of this patent is extended or adjusted under 35 U.S.C. 154(b) by 116 days.

(21) Appl. No.: 17/505,170

(22) Filed: Oct. 19, 2021

(65) Prior Publication Data

US 2023/0124947 A1 Apr. 20, 2023

(51) Int. Cl.
*H04L 47/125* (2022.01)
*H04L 41/5003* (2022.01)
*H04L 43/0876* (2022.01)

(52) U.S. Cl.
CPC ........ *H04L 47/125* (2013.01); *H04L 41/5003* (2013.01); *H04L 43/0876* (2013.01)

(58) Field of Classification Search
CPC ............... H04L 47/125; H04L 41/5003; H04L 43/0876
See application file for complete search history.

(56) References Cited

U.S. PATENT DOCUMENTS

| | | | |
|---|---|---|---|
| 7,992,201 B2 | 8/2011 | Aldridge et al. | |
| 10,425,340 B2 | 9/2019 | Avidar et al. | |
| 10,708,144 B2 | 7/2020 | Mohan et al. | |
| 10,972,387 B2 | 4/2021 | Iyer et al. | |
| 2016/0164787 A1* | 6/2016 | Roach ................. | H04L 41/0896 370/235 |
| 2020/0177503 A1* | 6/2020 | Hooda ..................... | H04L 12/66 |
| 2021/0044530 A1* | 2/2021 | Dhanabalan ........ | H04L 41/0894 |
| 2021/0279602 A1 | 9/2021 | Latapie et al. | |
| 2023/0064433 A1* | 3/2023 | Mao .................. | H04W 28/0958 |

FOREIGN PATENT DOCUMENTS

WO 2015106795 7/2015

OTHER PUBLICATIONS

Lillicrap, et al., "Continuous Control with Deep Reinforcement Learning", online: https://arxiv.org/pdf/1509.02971.pdf, CoRR, 2016, Jul. 5, 2019, 14 pages, arXiv.org.
"Goodput", online: https://en.wikipedia.org/wiki/Goodput, Aug. 2, 2020, 2 pages, Wikimedia Foundation, Inc.

* cited by examiner

*Primary Examiner* — Farzana B Huq
(74) *Attorney, Agent, or Firm* — James M. Behmke; James J. Wong

(57) ABSTRACT

In one embodiment, a device obtains data indicative of quality of experience for an online application. The device predicts, based on the data, path performances of network paths between an endpoint and the online application for different traffic loads. The device selects traffic loads for the network paths between the endpoint and the online application, based on the path performances predicted by the device. The device causes application traffic to be load balanced across the network paths between the endpoint and the online application, in accordance with those traffic loads selected by the device.

17 Claims, 10 Drawing Sheets

LOAD BALANCING APPLICATION TRAFFIC WITH PREDICTIVE GOODPUT ADAPTATION

TECHNICAL FIELD

The present disclosure relates generally to computer networks, and, more particularly, to load balancing application traffic with predictive goodput adaptation.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, load balancing mechanisms that seek to spread the full traffic load for an application across multiple paths can greatly complicate this optimization. Indeed, there are certain situations that can cause a machine learning-based routing mechanism to oscillate between suboptimal decisions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
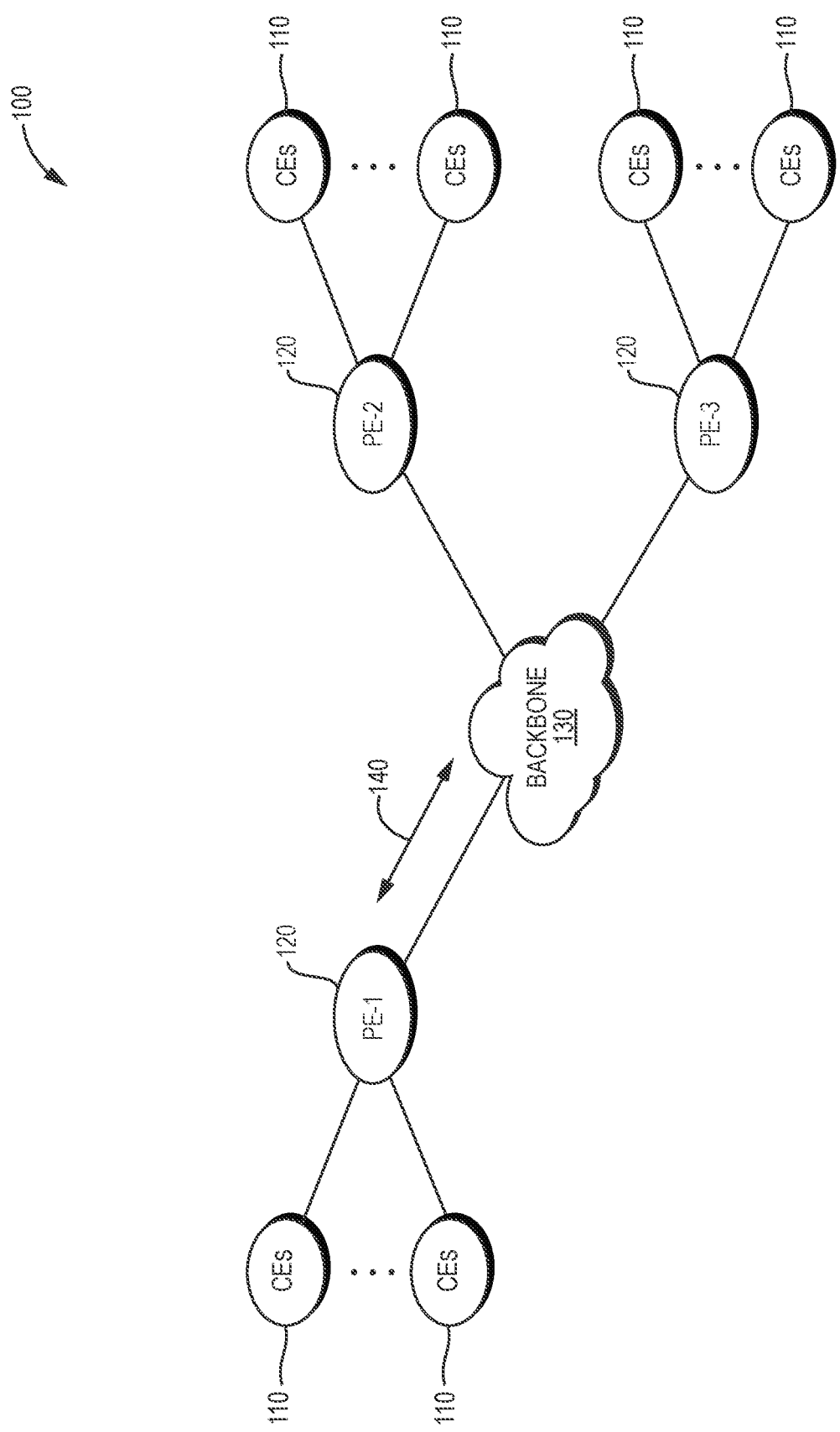
FIGS. 1A-1B illustrate an example communication network.

According to one or more embodiments of the disclosure, a device obtains data indicative of quality of experience for an online application. The device predicts, based on the data, path performances of network paths between an endpoint and the online application for different traffic loads. The device selects traffic loads for the network paths between the endpoint and the online application, based on the path performances predicted by the device. The device causes application traffic to be load balanced across the network paths between the endpoint and the online application, in accordance with those traffic loads selected by the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
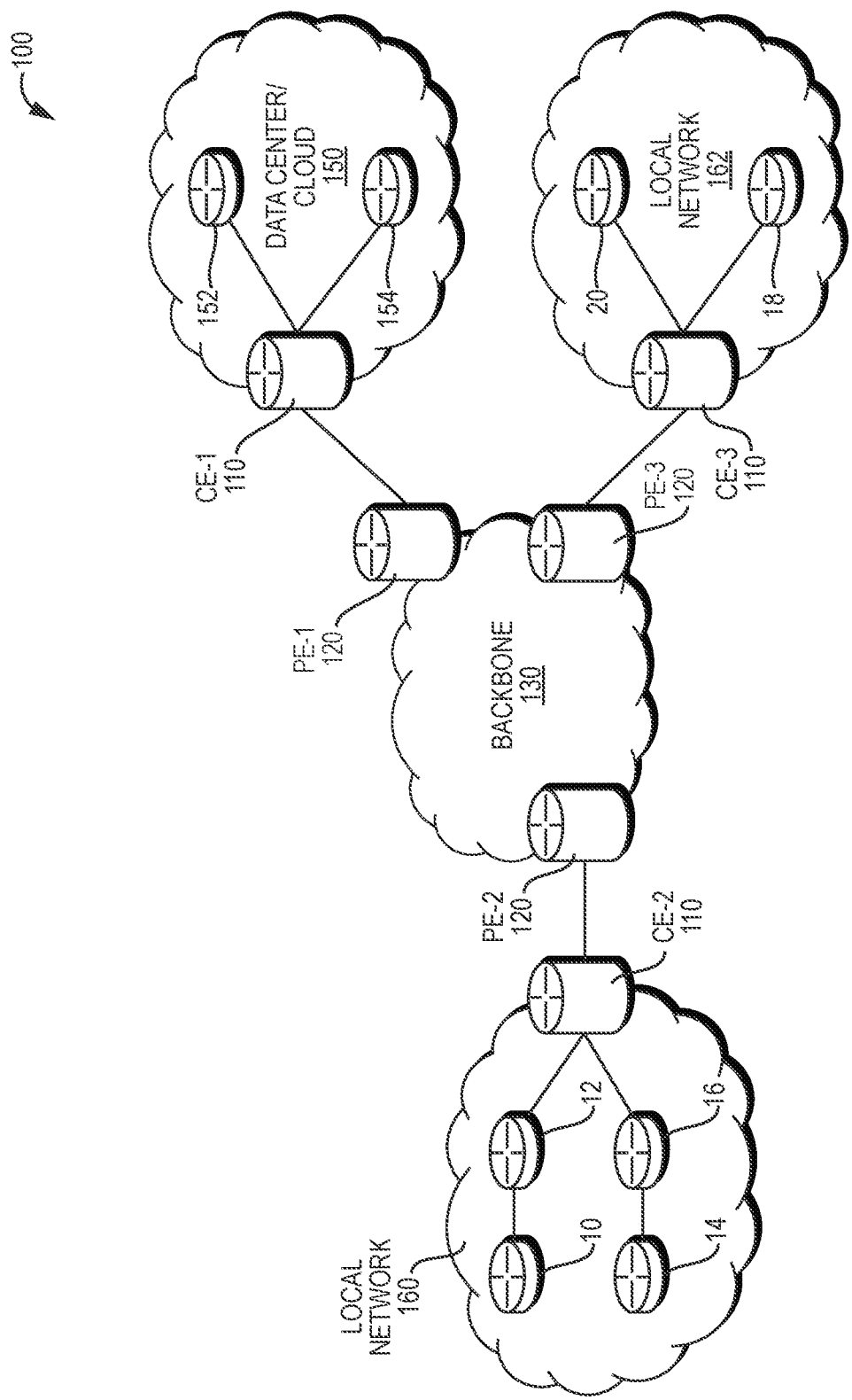

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
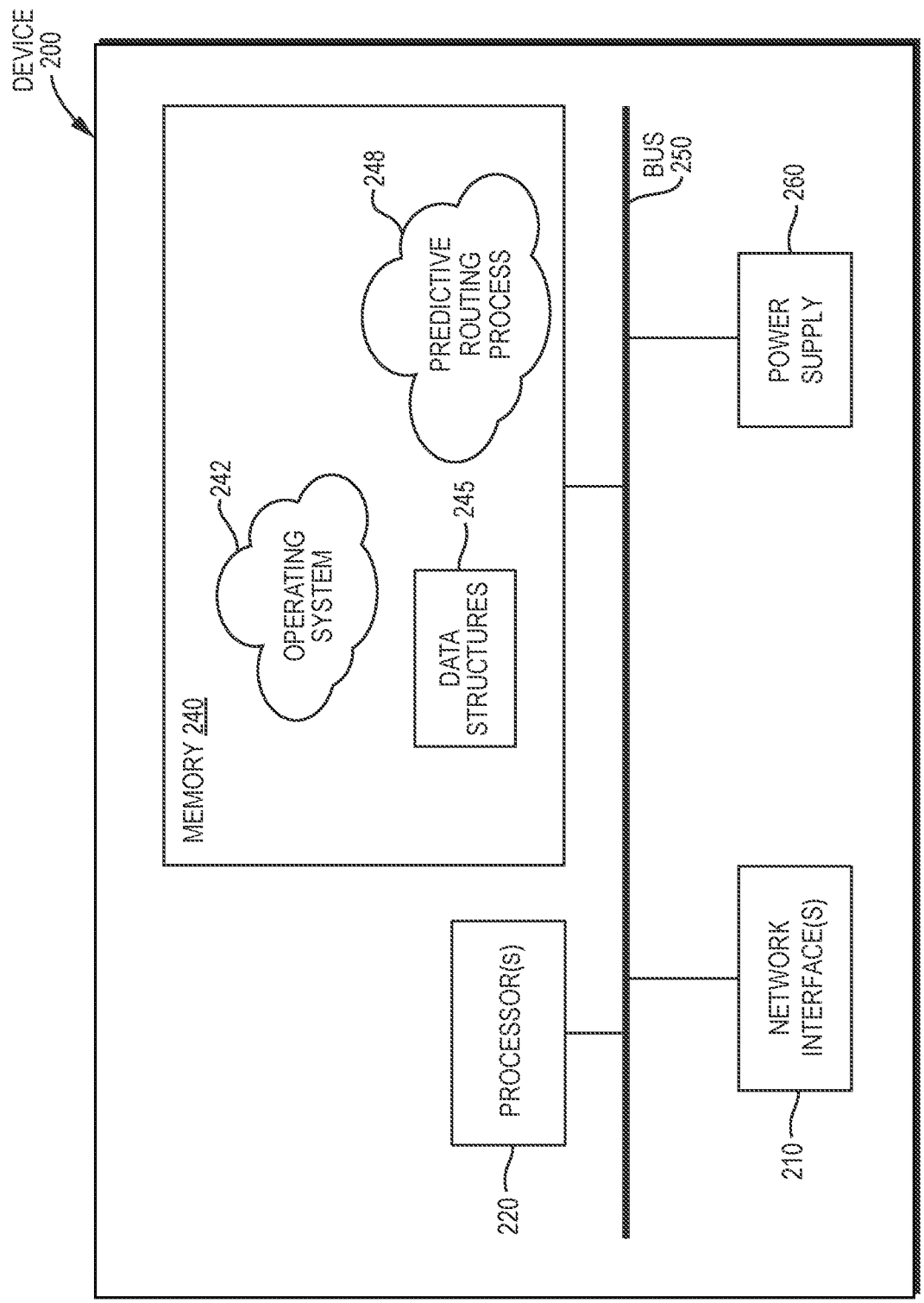
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time-series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
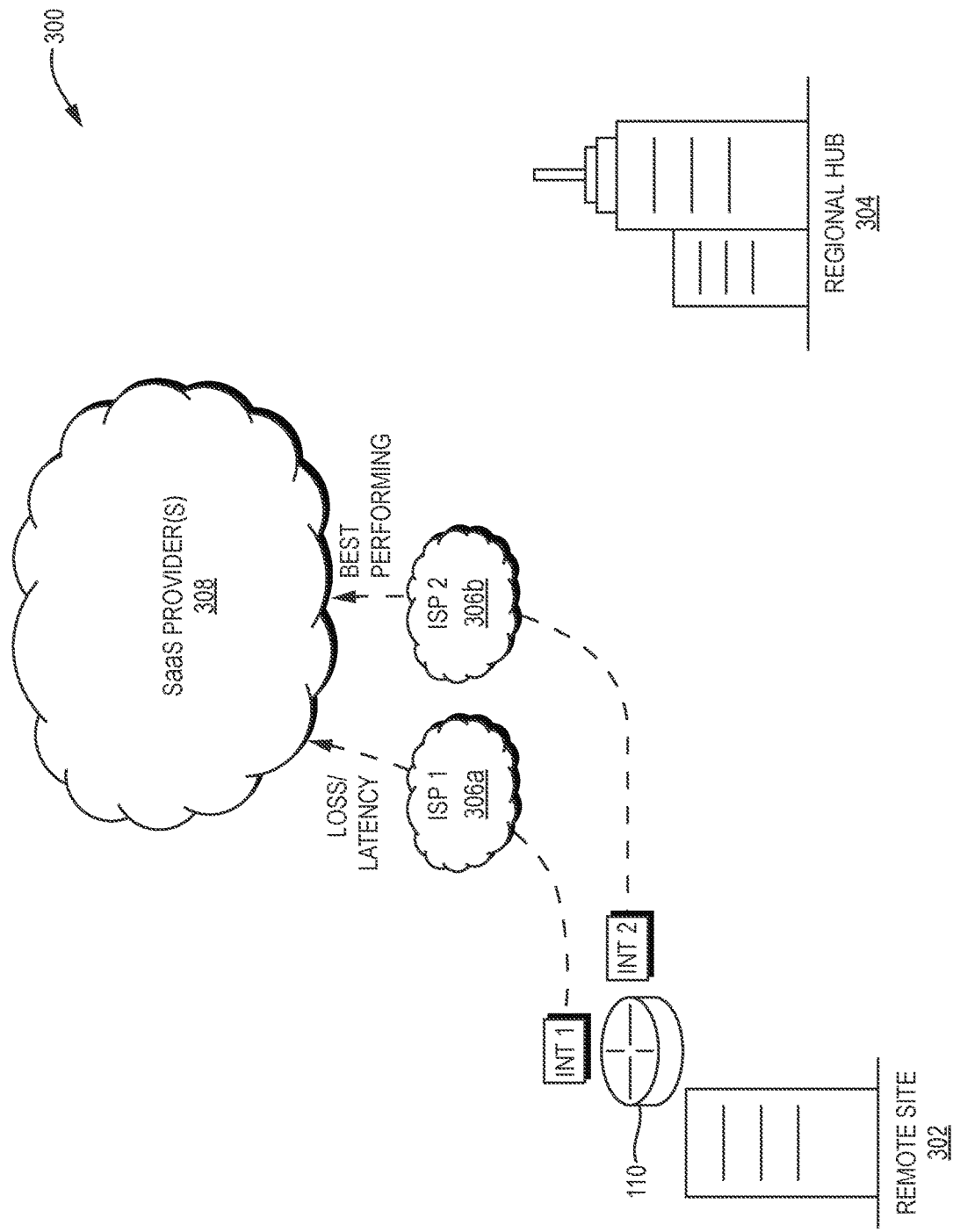
FIGS. 3A-3B illustrate example network deployments.
Figure 3B:
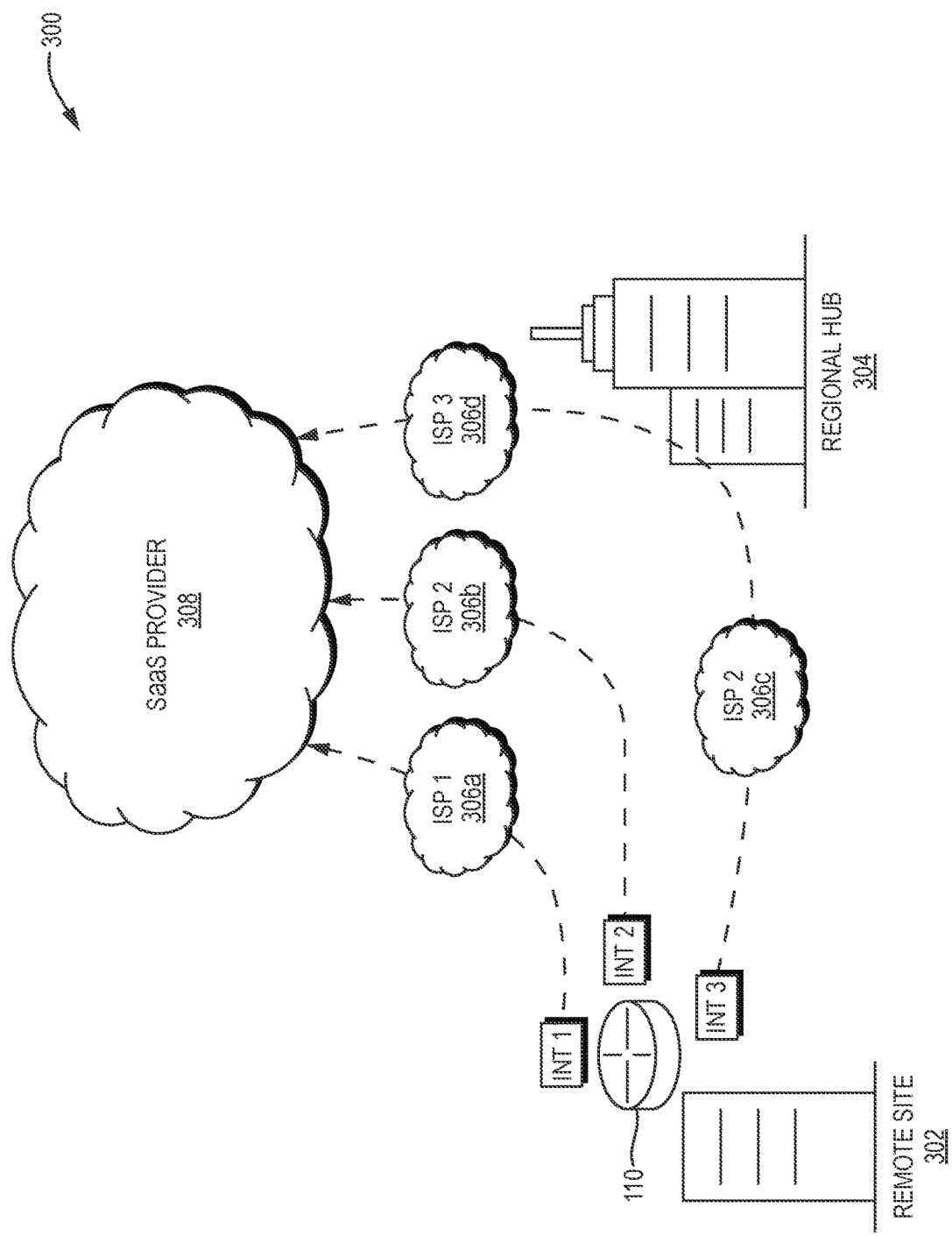

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
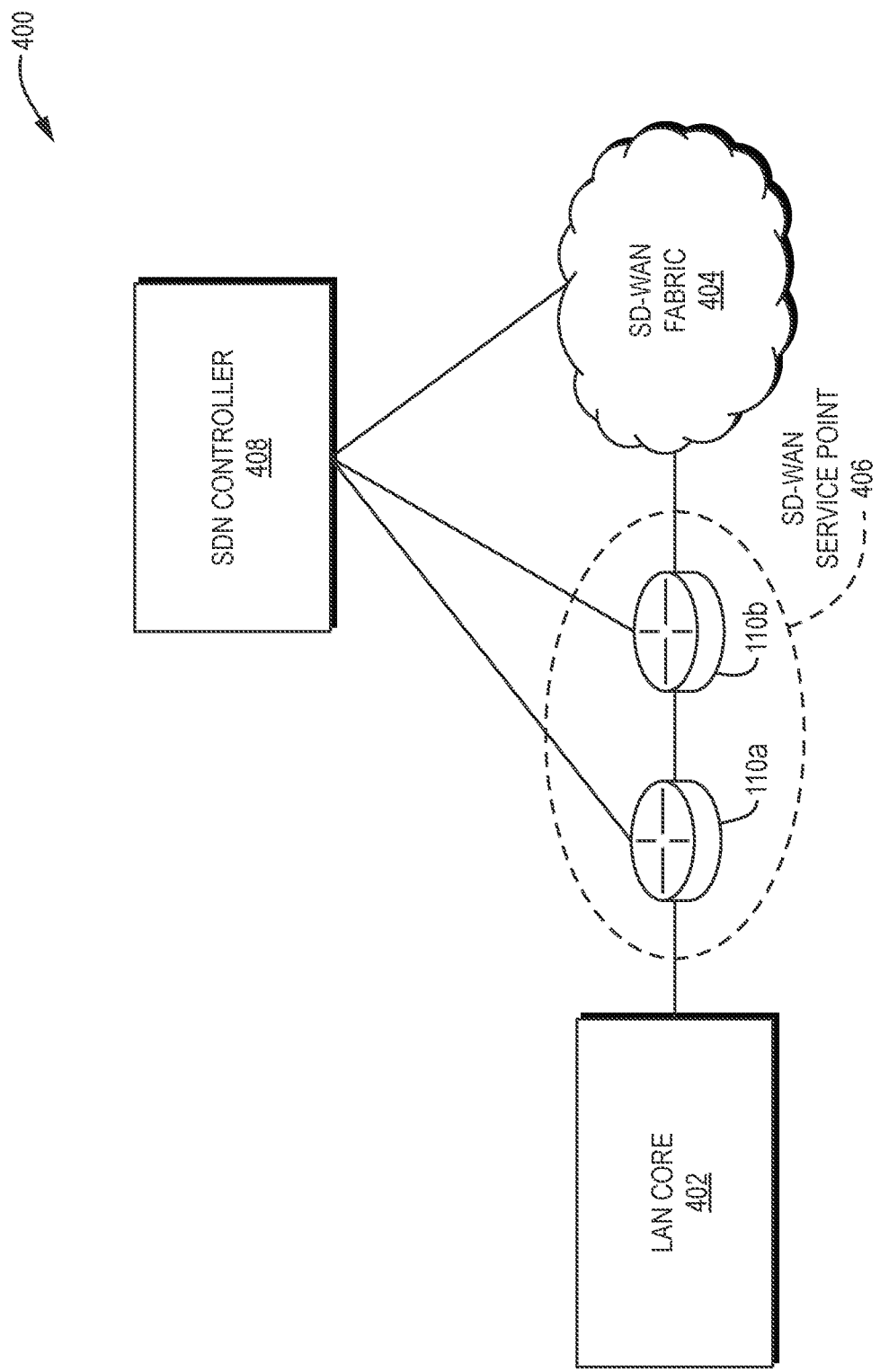
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
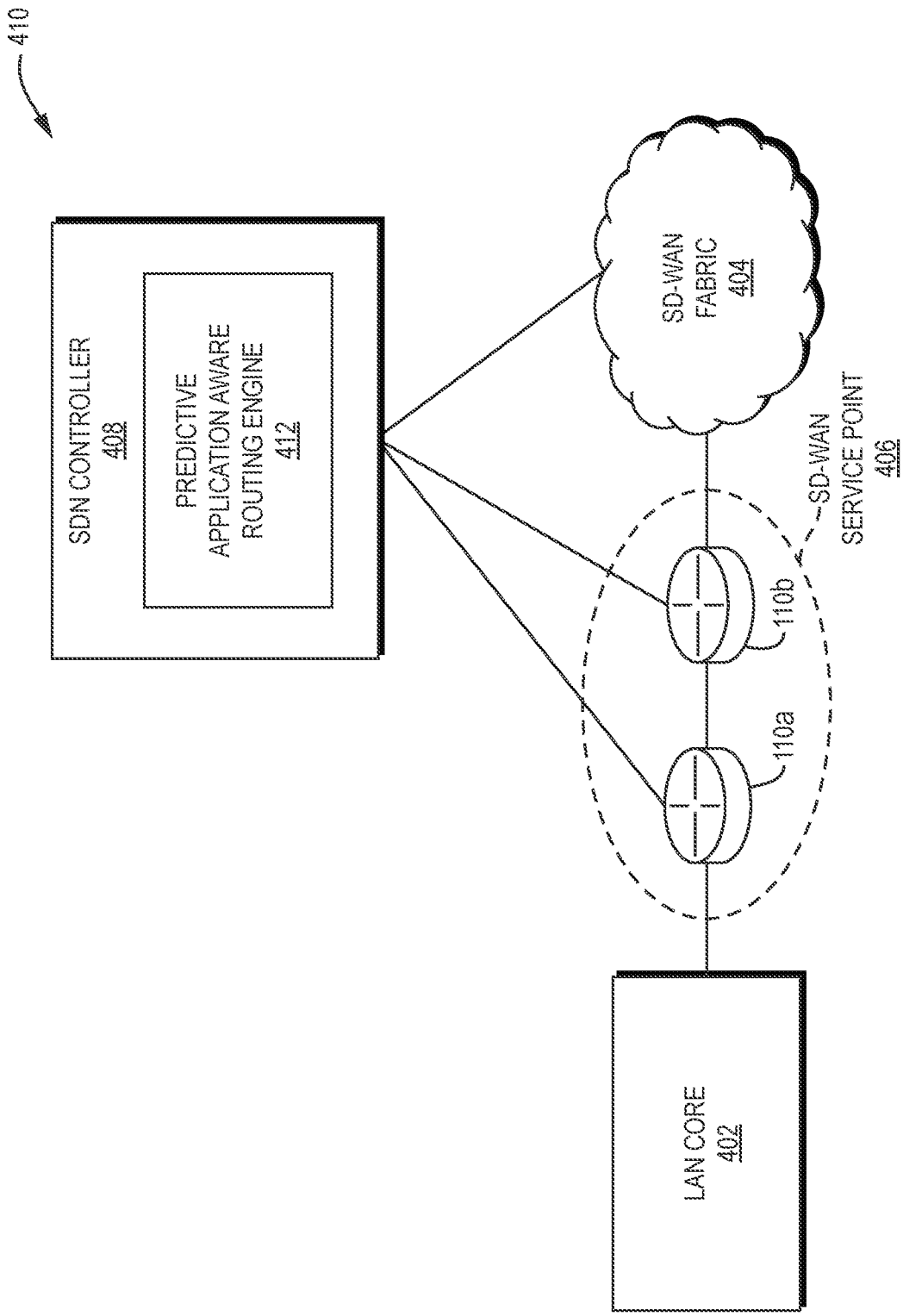

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, routing systems generally operate to select a path for traffic in a network. Indeed, the goal of routing protocols is merely to ensure connectivity, with limited notion of quality of service or application experience as part of routing. Furthermore, routing protocols make an all-or-nothing decision, that is, if a path is selected, it is assumed that it can carry all of the traffic without restrictions in terms of bandwidth.

Newly introduced technologies such as Application Aware Routing (AAR) or Cloud-on-Ramp (CoR) in Viptela SD-WAN account for the (implicit) feedback of the application (e.g., via SLA templates) so as to check a posteriori whether the SLAs are satisfied. IP and SD-WANs are capable of load balancing traffic across a plurality of paths. However, they do so in a purely reactive fashion, without any ability to learn from past experiences, especially situations where one or more selected links does not have enough capacity to carry the traffic. For instance, one issue with IP Load Balancing relates to the computation of IP link cost to maximize the number of Equal Cost Multiple Paths (ECMP), since asymmetrical load balancing for IP would unavoidably lead to intermittent loops. This leads to situations where a routing system might oscillate between different suboptimal decisions.

By way of example, assume that there is 200 Mbps of traffic to be routed over three paths with the following capacities:

Path A: 100 Mbps
Path B: 80 Mbps
Path C: 45 Mbps

None of the above paths/links can carry the entire traffic, yet it is possible to adjust the balancing ratios in a way that the traffic is optimally routed. Assume, however, that when the bandwidth limit is reached, the QoS of the path starts to suffer, with an increase in latency, jitter, and possibly loss.

At first, a traditional routing engine will use all three paths equally (e.g., ~67 Mbps on each), thus leading to SLA violations on Path C. As a result, the routing engine will exclude Path C from the allowed set of paths, leaving just Path A and Path B with 100 Mbps each. This will cause Path B to violate the SLA. In the meantime, though, Path C will again be a good routing candidate, since it no longer carries any traffic, which can be discerned via active probing of that path. Hence, the routing engine will set Path A and Path C as the new paths to be used which, in turn, will cause Path C to be violated again. As another result of rerouting the traffic onto Paths A and C, Path B will return back to normal operation and can again be selected as a back to normal and can be selected again.

Thus, in the above scenario, the routing system will oscillate between the solutions {Path A, Path B} and {Path A, Path C}, which are both causing roughly half of the traffic to be on a violating path at all times, although an equal balancing across the set {Path A, Path B, Path C} would be a better solution (with still 30% of the traffic being disrupted on Path C), and a proper balancing wherein 50% of the traffic is routed on Path A, and 30% on Path B, and 20% on Path C would lead to no violation at all. In other words, the ultimate goal is to quickly determine the proper balancing of traffic loads across Paths A-C, even in settings where the underlying goodput that can be delivered is varying over time. Note that the above scenario is an idealized one since, in practice, the capacity of every path varies constantly over time, which makes any reactive attempt nearly pointless.

Load Balancing Application Traffic with Predictive Goodput Adaptation

The techniques introduced herein address the problems encountered by certain routing systems that ignore the underlying bandwidth capacity of the selected paths. In some aspects, various embodiments introduced herein learn from past routing decisions to set the optimal balancing schemes across a set of paths between a source and destination endpoints. In one embodiment, supervised learning is used to explicitly build a model of the user experience (e.g., QoE), and then use the model to perform a search in the space of possible balancing schemes.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device obtains data indicative of quality of experience for an online application. The device predicts, based on the data, path performances of network paths between an endpoint and the online application for different traffic loads. The device selects traffic loads for the network paths between the endpoint and the online application, based on the path performances predicted by the device. The device causes application traffic to be load balanced across the network paths between the endpoint and the online application, in accordance with those traffic loads selected by the device.

Figure 5:
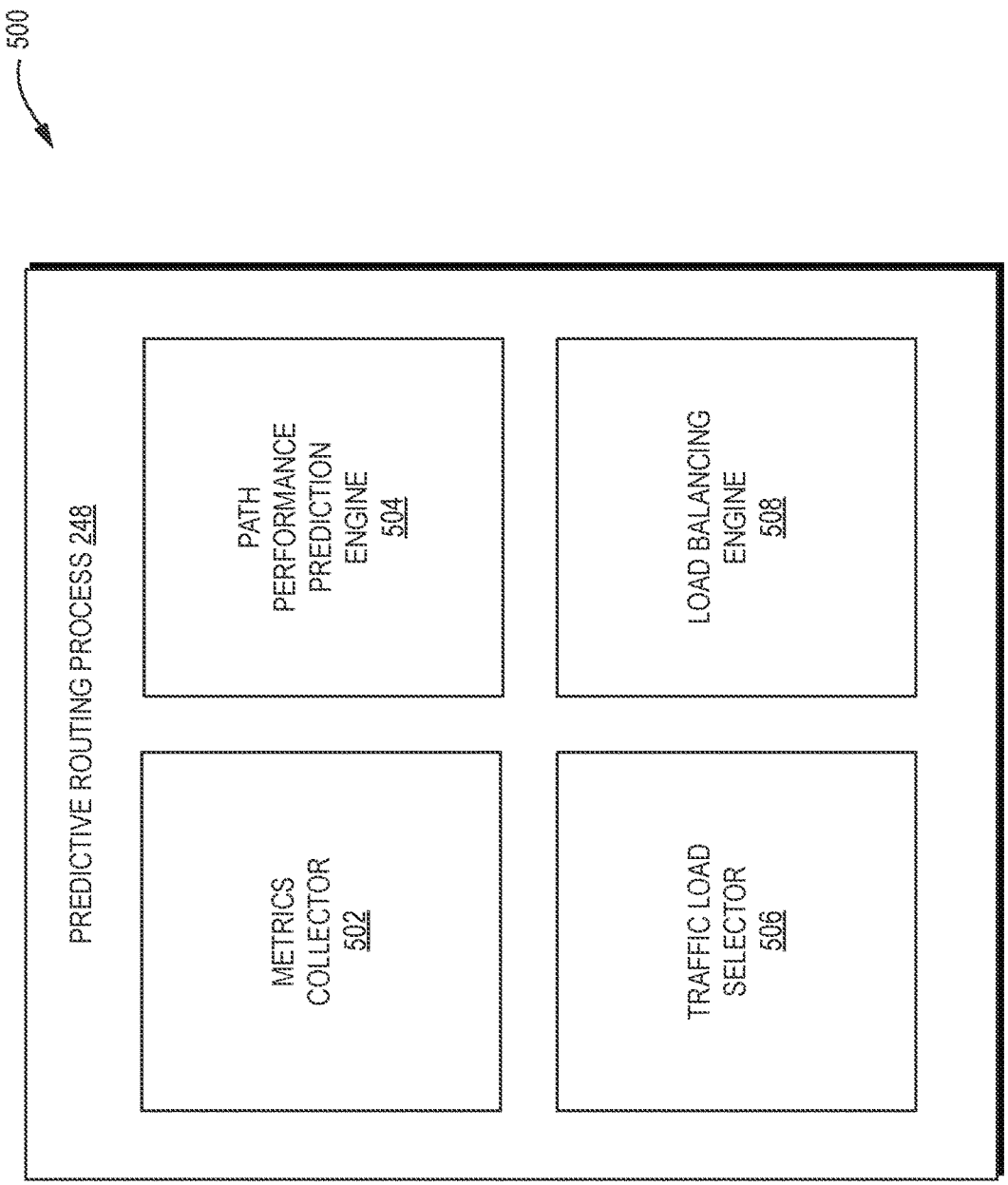
FIG. 5 illustrates an example architecture for load balancing application traffic with predictive goodput adaptation.

Operationally, FIG. 5 illustrates an example architecture 500 for load balancing application traffic with predictive goodput adaptation, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412.

As shown, predictive routing process 248 may include any or all of the following components: a metrics collector 502, a path performance prediction engine 504, a traffic load selector 506, and/or a load balancing engine 508. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

During execution, metrics collector 502 may obtain telemetry data from endpoints in the network and construct a dataset that maps traffic data (e.g., how much traffic from different applications is routed across which paths) and their corresponding QoE metrics. In some embodiments, metrics collector 502 may receive QoE metrics from a provider of an online application, such as an SaaS provider. These QoE metrics may be based, for instance, on ratings provided by users of that application (e.g., rating their satisfaction with the application on a scale of 0-5 stars, etc.). This data collection may occur in a central location (e.g., cloud) and performed continuously in a batch or in streaming fashion. In other embodiments, if directly QoE metrics are not available to metrics collector 502, metrics collector 502 may instead obtain path metrics indicative of SLA violations (e.g., packet loss, latency, jitter, etc.), which can be used as a proxy for actual QoE metrics from the application.

Metrics collector 502 may compile and store the data that it obtains in a suitable location (e.g., Amazon S3, a database, etc.) for consumption by path performance prediction engine 504. Note that the feedback related to application experience may be provided thanks to an application programming interface (API) (e.g., a WebEx User Experience Score, which is derived from L7 metrics such as loss concealment rates) or, in another embodiment, provided directly by the user (e.g, 5-star ratings or the like). For example, for critical paths (between two data centers), the user may be able to provide feedback on the QoE observed along each path. This feedback can be obtained thanks to the use of third-party tools or historical data (e.g., if a path traverse a given autonomous system whose QoE is well-known).

According to various embodiments, the techniques herein consider a network constituted of endpoints that exchange traffic with each other across a plurality of paths. These endpoints may, for example, take the form of different geographic locations (e.g., businesses, buildings, schools, etc.), edge routers, SD-WAN service points, or any other endpoint exchanging traffic in a computer network. In some embodiments, the load balancing techniques herein may operate associating a balancing vector, denoted $B(i,j)$, to every pair of endpoints $(E_i, E_j)$, whose size is the number of paths between the endpoints and describes how traffic should be balanced across these paths to achieve an optimal application experience.

Figure 6:
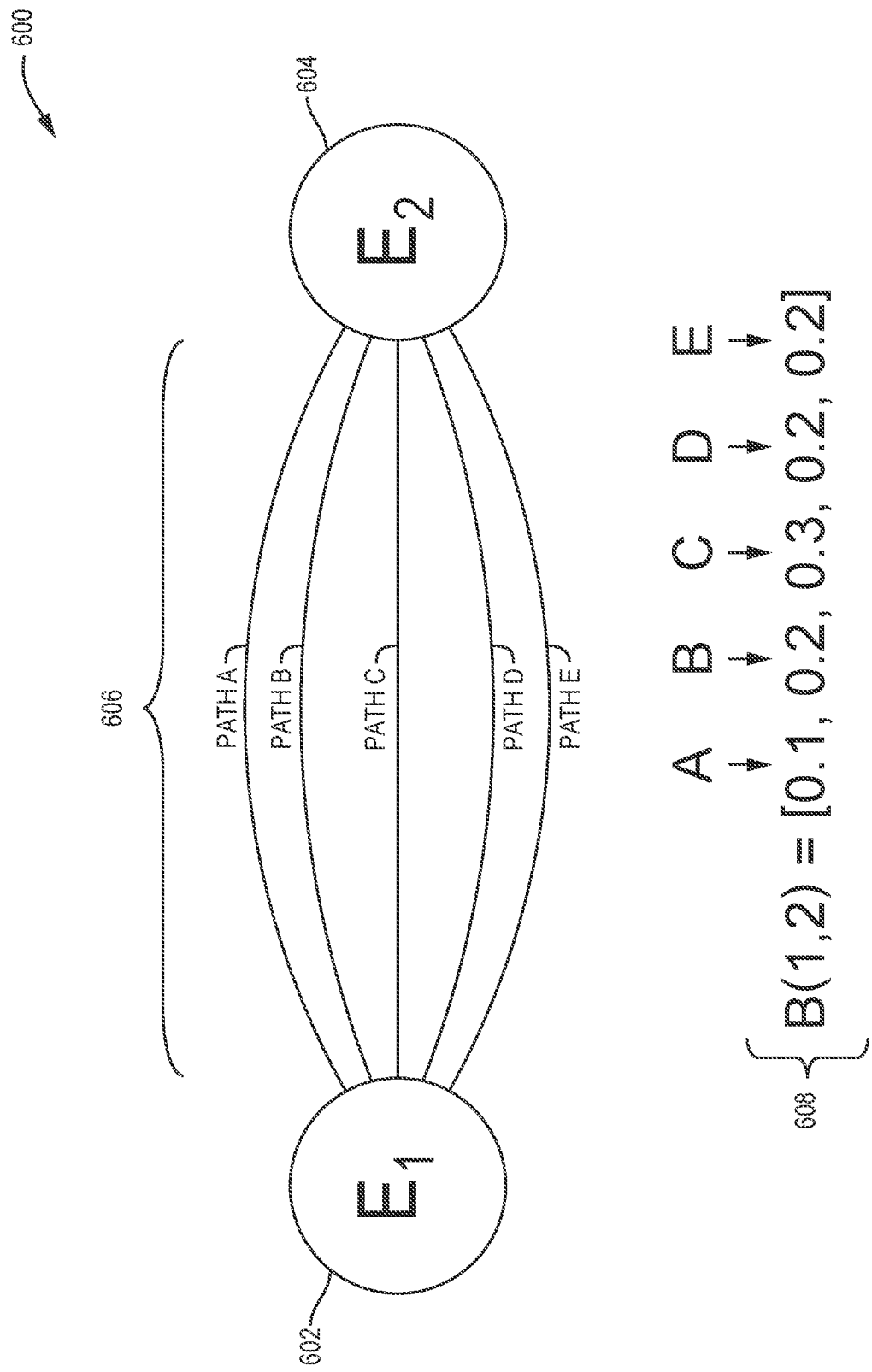
FIG. 6 illustrates an example of the evaluation of multiple paths between endpoints.

FIG. 6 illustrates an example 600 of the evaluation of multiple paths between endpoints, according to various embodiments. As shown, consider the case in which an endpoint 602, denoted $E_1$, is connected to another endpoint 604 (e.g., a SaaS endpoint), denoted $E_2$, via a plurality of network paths 606 (e.g., paths A-E shown).

In various embodiments, a vector 608 may be generated to describe how traffic should be balanced across these paths. For instance, the techniques herein may be used to compute the vector $B(1, 2)$ representing the connections between endpoint 602 and endpoint 604. In some instances, that the sum of the elements of vector 608 must be one, and some elements can be zero, thus indicating that the path should never be selected as a route.

Given the definition of vector 608, the goal is to determine the optimal vector B for every pair of endpoints in the network based on past routing decisions and their impact on application experience. To achieve this, some trial and error is possibly required at first, but the system will quickly learn the underlying behavior of the paths and adjust the load balancing, accordingly.

Referring again to FIG. 5, path performance prediction engine 504 may be configured to train a machine learning model that predicts, for an arbitrary timestamp and a given amount of traffic on every path between an endpoint pair, the experience of users whose application traffic is routed from one endpoint to the other, in various embodiments. Note that this model may be a collection of models, each operating at the granularity of a given path, or a single model, operating directly at the level of the endpoint pair, without any loss of generality. Regardless, path performance prediction engine 504 may use its trained model(s) to predict the path performances for different balancing schemes, either as QoE metrics or a proxy, such as the probability of SLA violations.

For instance, path performance prediction engine 504 may be implemented using a deep neural network (DNN), either using a feedforward mechanism with some carefully crafted features based on historical data or targeted to time-series (RNN, LSTM, Transformers, etc.), or a classical algorithm (e.g., boosted trees, random forests). Regardless of the exact nature of the algorithm, the training procedure is similar, and it consists in minimizing a loss function that represents the error made by the model on a training set. Here, the training dataset is constituted of historical mappings between a given traffic load on a set of paths at a given point in time and the experience score given by the users (or a proxy thereof), as obtained by metrics collector 502. The resulting model is denoted M hereafter.

Traffic load selector 506 may operate in conjunction with path performance prediction engine 504, to perform a live optimization of the load balancing based on the predictions made by model M of path performance prediction engine 504. For instance, given an amount T of traffic to be routed between endpoint E1 and E2, traffic load selector 506 may generate a candidate vector B*(1, 2) that optimizes the user experience by performing a search in the space spanned by all possible vectors B(1, 2). A variety of algorithms can be used by traffic load selector 506 to perform this search, ranging from grid search to Monte Carlo methods. Note that the objective of the search may not be to strictly optimize the user experience, but to solve an exploration-exploitation tradeoff between achieving optimal user experience and collecting useful data points to train M. In this case, the objective function is a combination of the user experience and the expected information gain (or a proxy thereof) expected from measuring the user experience for balancing scheme B*(1, 2).

Load balancing engine 508 may be responsible for causing the application traffic between any two given endpoints to be load balanced according to the vector generated by traffic load selector 506. In some embodiments, load balancing engine 508 may take the form of an automation agent running on-premise that takes as input the vector B*(1, 2) from traffic load selector 506 and updates the configuration of endpoints E1 and E2 such that traffic is load balanced according to the scheme prescribed by B*.

In another embodiment of the invention, path performance prediction engine 504 and traffic load selector 506 may be implemented as a single end-to-end differentiable program (e.g., a combination of DNNs that are trained end-to-end using backpropagation to solve a specific task) trained using reinforcement learning. In this case, the program takes as input the same features as model M, but its output is directly the multi-variate vector B*. In the field of reinforcement learning, this is known as the policy, often denoted p, that maps observations to actions. Various deep reinforcement learning techniques may be used to train this policy with a reward that corresponds to the average user experience. Since the action space is continuous, example algorithms that could be used include Deep DPG and other extensions of Deep Q-Learning to the continuous action domain. In simpler embodiments, one can make the action space continuous by allowing discrete values of B*, and then allow to recourse to more classical algorithms such as Q-Learning.

In another embodiment, any or all of the functionalities of predictive routing process 248 may be implemented directly at the edge of the network, such as on an edge router. For instance, the model M of path performance prediction engine 504 may be pushed to the edge router, which then performs the optimization of B*(1, 2) directly on the edge router. Under such circumstances, the system can be made fully proactive by endowing the edge router with a traffic predictor (possibly using a very lightweight time-series model based on seasonal-trend decomposition) and then using traffic forecasts to proactively set the optimal balancing.

Figure 7:
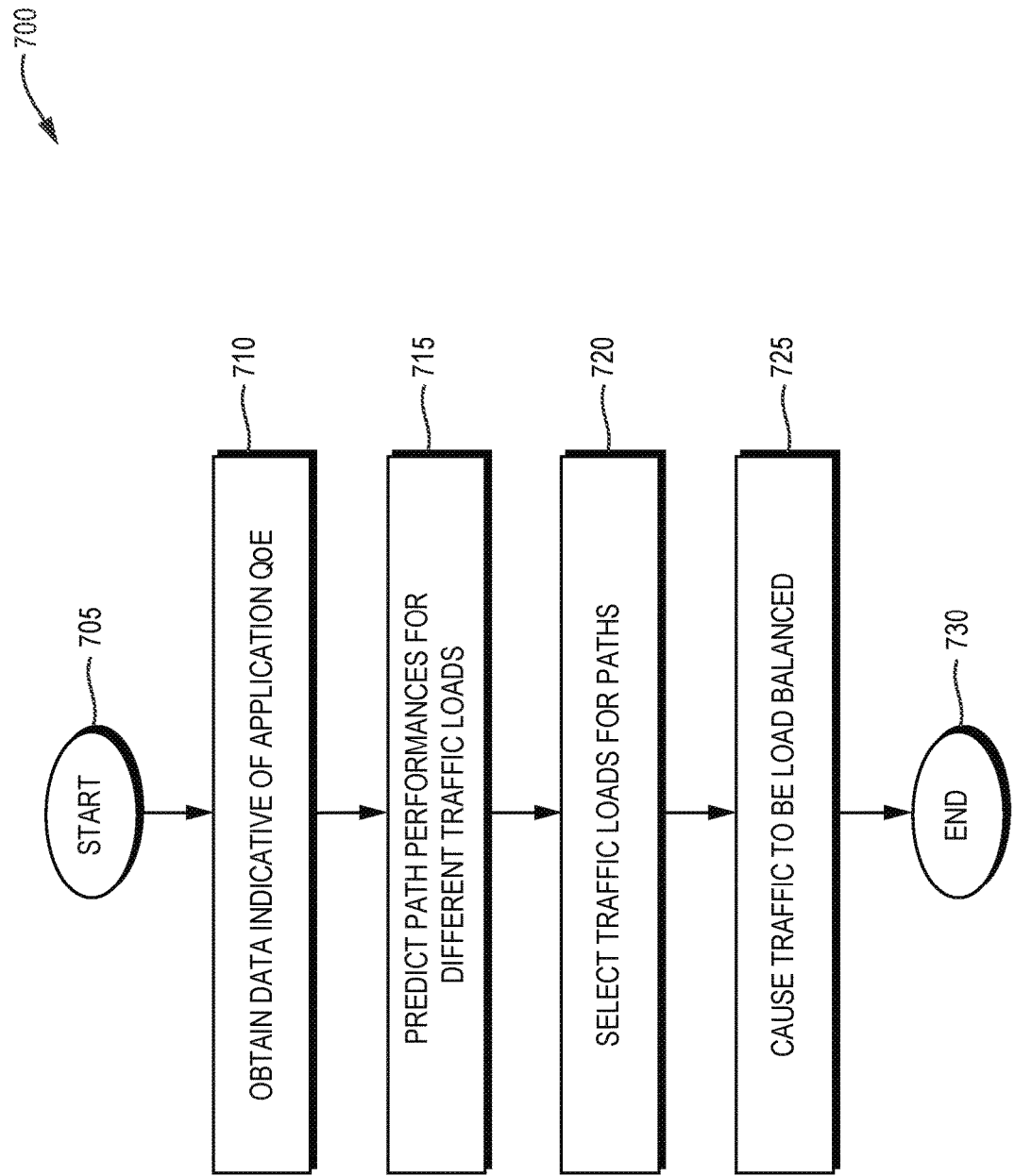
FIG. 7 illustrates an example simplified procedure for load balancing application traffic with predictive goodput adaptation.

FIG. 7 illustrates an example simplified procedure 700 (e.g., a method) procedure for load balancing application traffic with predictive goodput adaptation, in accordance with one or more embodiments described herein. For example, a non-generic, specifically configured device (e.g., device 200), such as controller for a network (e.g., an SDN controller, an edge router, or other device in communication therewith), may perform procedure 700 by executing stored instructions (e.g., predictive routing process 248). The procedure 700 may start at step 705, and continues to step 710, where, as described in greater detail above, the device may obtain data indicative of quality of experience (QoE) for an online application. In one embodiment, the device may obtain that data from a provider of the online application. In another embodiment, the data may be based on ratings provided by users of the online application (e.g., rating their satisfaction with the application on a defined scale, etc.). In a further embodiment, the data may comprise indications of service level agreement (SLA) violations by one or more of the network paths between an endpoint and the online application. Such violations may be used, for instance, as a proxy for actual user ratings, if they are not available.

At step 715, as detailed above, the device may predict, based on the data, path performances of network paths between an endpoint and the online application for different traffic loads. In various embodiments, the device may do so by using one or more machine learning models to predict the path performances. In some embodiments, the path performances may include QoE metrics for the online application or proxy metrics (e.g., delay, loss, jitter, SLA violations, etc.).

At step 720, the device may select traffic loads for the network paths between the endpoint and the online application, based on the path performances predicted by the device, as described in greater detail above. In various embodiments, the device may select the traffic loads by searching through the predictions for a combination of traffic loads that maximize the expected QoE for the application.

At step 725, as detailed above, the device may cause application traffic to be load balanced across the network paths between the endpoint and the online application, in accordance with those traffic loads selected by the device. In various embodiments, the device may do so by notifying an edge router associated with the endpoint of the traffic loads selected by the device. For instance, if the device is an SD-WAN controller, it may send the selected traffic loads to the edge router, to enforce that load balancing. In other embodiments, the device itself may be the edge router associated with the endpoint. In some embodiments, the load balancing may be uneven, such that at least one of the network paths communicates a larger amount of the application traffic than that of another one of the network paths. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for load balancing application traffic with predictive goodput adaptation, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, data indicative of quality of experience for an online application, wherein the data indicative of the quality of experience is based on satisfaction ratings provided by users of the online application;
predicting, by the device and for different traffic loads, path performances of network paths between an endpoint and the online application based on the data indicative of quality experience for the online application by using one or more machine learning models, wherein the path performances comprise predicted quality of experience metrics for the online application;
selecting, by the device, traffic loads for the network paths between the endpoint and the online application, based on the path performances predicted by the device; and
causing, by the device, application traffic to be load balanced across the network paths between the endpoint and the online application by notifying an edge router associated with the endpoint, in accordance with those traffic loads selected by the device.

2. The method as in claim 1, wherein the device obtains the data indicative of quality of experience for the online application from a provider of the online application.

3. The method as in claim 1, wherein the data indicative of quality of experience for the online application comprises indications of service level agreement (SLA) violations by one or more of the network paths between the endpoint and the online application.

4. The method as in claim 1, wherein causing the application traffic to be load balanced across the network paths between the endpoint and the online application, in accordance with the traffic loads selected by the device, comprises:
causing at least one of the network paths to communicate a larger amount of the application traffic than that of another one of the network paths.

5. The method as in claim 1, wherein causing the application traffic to be load balanced across the network paths between the endpoint and the online application, in accordance with the traffic loads selected by the device, comprises:
notifying an edge router associated with the endpoint of the traffic loads selected by the device.

6. The method as in claim 1, wherein the device is the edge router associated with the endpoint.

7. The method as in claim 1, wherein the online application is a software-as-a-service (SaaS) application.

8. The method as in claim 1, wherein the predicted quality of experience metrics for the online application comprise delay, loss, jitter, or a number of service level agreement (SLA) violations.

9. An apparatus, comprising:
one or more network interfaces;
a processor coupled to the one or more network interfaces and configured to execute one or more processes; and
a memory configured to store a process that is executable by the processor, the process when executed configured to:
obtain data indicative of quality of experience for an online application, wherein the data indicative of the quality of experience is based on satisfaction ratings provided by users of the online application;
predict, different traffic loads, path performances of network paths between an endpoint and the online application based on the data indicative of quality experience for the online application by using one or more machine learning models, wherein the path performances comprise predicted quality of experience metrics for the online application;
select traffic loads for the network paths between the endpoint and the online application, based on the path performances predicted by the apparatus; and
cause application traffic across the network paths between the endpoint and the online application by notifying an edge router associated with the endpoint, in accordance with those traffic loads selected by the apparatus.

10. The apparatus as in claim 9, wherein the apparatus obtains the data indicative of quality of experience for the online application from a provider of the online application.

11. The apparatus as in claim 9, wherein the data indicative of quality of experience for the online application comprises indications of service level agreement (SLA) violations by one or more of the network paths between the endpoint and the online application.

12. The apparatus as in claim 9, wherein the apparatus causes application traffic to be load balanced across the network paths between the endpoint and the online application by:
causing at least one of the network paths to communicate a larger amount of the application traffic than that of another one of the network paths.

13. The apparatus as in claim 9, wherein the apparatus causes application traffic to be load balanced across the network paths between the endpoint and the online application, by:

notifying an edge router associated with the endpoint of those traffic loads selected by the apparatus.

14. The apparatus as in claim 9, wherein the apparatus is the edge router associated with the endpoint.

15. The apparatus as in claim 9, wherein the predicted quality of experience metrics for the online application comprise delay, loss, jitter, or a number of service level agreement (SLA) violations.

16. A tangible, non-transitory, computer-readable medium storing program instructions that cause a device to execute a process comprising:

obtaining, by the device, data indicative of quality of experience for an online application, wherein the data indicative of the quality of experience is based on satisfaction ratings provided by users of the online application;

predicting, by the device and for different traffic loads, path performances of network paths between an endpoint and the online application based on the data indicative of quality experience for the online application by using one or more machine learning models, wherein the path performances comprise predicted quality of experience metrics for the online application;

selecting, by the device, traffic loads for the network paths between the endpoint and the online application, based on the path performances predicted by the device; and causing, by the device, application traffic to be load balanced across the network paths between the endpoint and the online application by notifying an edge router associated with the endpoint, in accordance with those traffic loads selected by the device.

17. The tangible, non-transitory, computer-readable medium as in claim 16, wherein the predicted quality of experience metrics for the online application comprise delay, loss, jitter, or a number of service level agreement (SLA) violations.

\* \* \* \* \*